United States Patent [19]

Furusawa

[11] Patent Number: 5,006,945
[45] Date of Patent: Apr. 9, 1991

[54] DISK PLAYER HAVING DUAL-SIDE PLAYBACK CAPABILITY

[75] Inventor: Shigeharu Furusawa, Saitama, Japan

[73] Assignee: Pioneer Electronic Corp., Tokyo, Japan

[21] Appl. No.: 482,626

[22] Filed: Feb. 21, 1990

[30] Foreign Application Priority Data

Feb. 22, 1989 [JP] Japan .................................. 1-42653
Oct. 19, 1989 [JP] Japan ................................ 1-272571

[51] Int. Cl.$^5$ ...................................... G11B 17/028
[52] U.S. Cl. ............................. 360/99.12; 360/99.08; 369/270; 369/271
[58] Field of Search .................. 360/99.12, 99.08; 369/270, 271

[56] References Cited

U.S. PATENT DOCUMENTS 4,541,086  9/1985  Tanaka .............................. 369/271
4,771,416  9/1988  Ishibashi et al. ................... 369/270

Primary Examiner—Robert S. Tupper
Attorney, Agent, or Firm—Sughrue, Mion, Zinn, Macpeak & Seas

[57] ABSTRACT

A dual-side use disk player comprises a pressure applying mechanism and a position select/hold mechanism. The pressure applying mechanism includes an attracting force generating mechanism for attracting a pressure member toward a turntable. The pressure applying mechanism applies a disk pressing force to the pressure member for pressing a disk against the turntable. The pressure member holds a second centering member to be inserted into a center hole of a circular substrate placed on the side of the disk which is out of contact with the turntable. When a support member for supporting the pressure member is at a non-clamping position or farthest from the turntable, the position select/hold mechanism holds the pressure member at a position apart from the disk carrying surface of the turntable. When the support member is at a first clamping position and a second position, the position select/hold mechanism is out of contact with the pressure member. With the movement of the support member between the first clamping position and the second clamping position, the position select/hold mechanism positions the second centering means at an insertion allowing position where the second centering means is allowed to be inserted into the center hole of the circular substrate, and an insertion prohibiting position where the second centering means is prohibited from being inserted thereinto. Further, when the support member is at the second position and the second centering member is at the insertion allowing position, the second centering member is closer to the support member than the disk contact member.

8 Claims, 13 Drawing Sheets

DISK PLAYER HAVING DUAL-SIDE PLAYBACK CAPABILITY

BACKGROUND OF THE INVENTION

1. Field of the Invention

The present invention relates to a dual-side use disk player of the type in which data is played back from both sides of a data record disk (referred to as a disk) consisting of a pair of circular substrates each having a signal recording layer.

2. Prior Art Description

There has been known a dual-side use disk player. In this type of disk player, a disk consists of a pair of circular substrates each having a recording layer. A pair of pick-ups is provided for the recording layers on both sides of the disk. With provision of the pair of pick-ups, data can be played back from the recording layers on both sides of the disk, without flipping over the disk. With such a structure, in the case where the circular substrates, which are bonded together to constitute the disk, are radially displaced by a distance "e" from each other, (see FIG. 1). the circular substrates must be individually centered on a turntable, to ensure a smooth playback of data from the recording layers on both sides of the disk.

FIG. 1 is a sectional view showing a disk clamp mechanism constituting a key portion of a conventional dual-side use disk player in which the disk substrates are individually centered on the turntable for playing back the recorded data, and a disk centering means for centering the disk on the turntable.

As shown in FIG. 1, a turntable 2 is fixed to and turns with a spindle shaft 1 of a spindle motor. A disk 3, which is to be placed on the turntable 2, consists of a pair of circular substrates 3a and 3b bonded together, which respectively have signal recording layers. A disk support surface 2a of the turntable 2 has a recessed area. A first centering member 5, which is provided within the recessed area, is arranged such that it moves up and down with respect to the disk support surface 2a. The first centering member 5 is guided by the shaft 1, biased by a coiled spring 6, and centers the circular substrate 3b of the disk 3 through a center hole of the circular substrate 3b.

A support member 7 is provided above the turntable 2, and is movable in a direction orthogonal to the disk support surface 2a of the turntable 2. Further, a means (not shown) is provided to position the support member 7 at three positions, a non-clamping position as shown in FIG. 1, and first and second clamping positions as shown in FIGS. 2 and 3.

A pushing means including a rotating member 8 and a disk contact member 9, which is rotatably and vertically, movably provided on the support member 7, pushes the disk 3 toward the turntable 2. More specifically, the rotating member 8 contains a column part 8a and a flange 8b. The column part 8a of the rotating member 8 is movably inserted in an opening 7a of the support member 7. The rotating member 8 is in contact with an inner race 10a of a ball bearing 10. An intermediate member 10c is fixed to an outer race 10b of the ball bearing 10. The member 10c, when operated, contacts a stopper 11, which is made of resilient material and is mounted on the lower surface of the support member 7.

The disk contact member 9, which cooperates with the rotating member 8 to form the pushing means and comes in contact with the disk 3, is movable in the axial direction of the rotating member 8. A coiled spring 12 is placed between the rotating member 8 and the disk contact member 9.

A second centering member 13, mounted to the rotating member 8, is movable in the axial direction of the rotating member 8. The second centering member 13 is for centering the circular substrate 3a of the disk 3 through a center hole of the substrate 3a. The second centering member 13 is supported by a lug 8d of the rotating member 8. A coiled spring 14 is placed between the rotating member 8 and the second centering member 13.

A pair of optical pick-ups 16 and 17 are provided between which the disk 3 is placed on the turntable 2. The pair of pick-ups are guided and moved along the recording surfaces of the disk 3 by means of a drive means (not shown).

Operations of the dual-side use disk player thus arranged will now be briefly described. A first operation of the player is to play back data stored in a recording layer of the circular substrate 3b of the disk 3, i.e., the substrate in contact with the turntable 2. During operation, the support member 7 is moved from the non-clamping position shown in FIG. 1 toward the turntable 2, and is positioned at the first clamping position shown in FIG. 2. At this position, the disk contact member 9 comes in contact with the disk 3, and the coiled spring 12 is compressed. The compressed spring pushes the disk 3 against the turntable 2. At the same time, the first centering member 5 is urged into the center hole of the circular substrate 3b. to center the substrate 3b on the turntable. At this time, the flange 8b of the rotating member 8 moves away from the support member 7. The intermediate member 10c, fixed to the outer race 10b of the ball bearing 10, comes in contact with the stopper 11 of the lower surface of the support member 7, with a predetermined resistance existing therebetween. Under this condition, the turntable 2 is rotated, while the lower side optical pick-up 17 picks up data from the recording layer on the substrate 3b.

Now, an operation to play back data of the recording layer on the circular substrate 3a of the disk will be described. In the operation, the support member 77 is further moved toward the turntable 2 and reaches the second position shown in FIG. 3. Accordingly, the rotating member 8 descends on the disk contact member 9 that has been in contact with the disk 3 and in a fixed state. The coiled spring 14 is then compressed and urges the second centering member 13, that has been supported by the lug 8d of the rotating member 8, to enter the center hole of the circular disk 3a, so that the disk 3 is slightly displaced in the radial direction. At the same time, a tubular portion of the second centering member 13 comes in contact with the first centering member 5, to push the first centering member 5 out of the center hole of the circular substrate 3b and to set it below the level of the disk support surface of the turntable 2. Through the above operation, the circular substrate 3a is centered on the turntable 2. Under this condition, the turntable 2 is reversely rotated, while the optical pick-up 16 disposed above the disk 3 picks up data recorded in the recording layer on the circular substrate 3a.

In the disk player thus arranged, when data is played back from the recording layer on the upper circular substrate 3a, which is not yet in contact with the turntable 2, the coiled spring 12, which has been compressed to bias the disk contact member 9 by a certain force, is further compressed. In a situation where the pressure on the disk is extremely high, and a coefficient of friction between the disk 3 and the disk support surface of the turntable 2 is increased due to humidity, for example, the frictional force is greatly increased between the disk and disk support surface. Under this condition, if the second centering member 13 is inserted into the center hole of the substrate 31, the disk 3 will not move in a radial direction, resulting in failure of the centering of the disk on the turntable.

In a disk clamping mode, the support member 7 is constantly in contact with the ball bearing 10. Therefore, an external vibration having an adverse effect on the playback of the disk is transferred through the support member 7, the ball bearing 10 and the rotating member 8 to the second centering member 13 and the first centering member 5, and finally to the disk 3.

The ball bearing 10 must be of the radial type, and rotate at a high speed for a long time while being subjected to a large thrust load. At this time, the required rotating accuracy must be ensured. Use of a ball bearing of such a superior durability leads to an increased cost to manufacture.

SUMMARY OF THE INVENTION

Accordingly, an object of the present invention is to provide a dual-side use disk player which smoothly centers on a turntable a pair of the circular substrates making up a disk, satisfactorily protects the disk that is currently being played back from an external vibration, and reduces the cost to manufacture.

In a dual-side use disk player according to the present invention, a pressure applying means for applying a pressing force to a pressure member for pressing a disk against a turntable is provided. The pressure member holds a second centering member to be inserted into a center hole of a circular substrate disposed on the non-contact side of the disk (i.e., the side which is out of contact with a turntable). The pressure applying means includes attracting force generating means for attracting the pressure member toward the turntable; and position select/hold means is also provided. When a support member for supporting the pressure member is at a non-clamping position farthest from the turntable, the position select/hold means holds the pressure member at a position apart from the disk carrying surface of the turntable. When the support member is at a first clamping position which is a middle position and a second position which is closest to the turntable, the position select/hold means is out of contact with the pressure member. Further, with the movement of the support member between the first clamping position and the second clamping position the position select/hold means positions the second centering means at an insertion allowing position where the second centering means is allowed to be inserted into the center hole of the circular substrate, and an insertion prohibiting position where the second centering means is prohibited from being inserted thereinto. With such an arrangement, the disk pressing forces applied to the disk when the circular substrates constituting the disk are centered, are substantially equal to each other. Further, transfer of an external vibration to the disk currently being played back is prevented.

In another dual-side use disk player according to the present invention, a pressure applying means for applying a pressing force to a pressure member for pressing a disk against a turntable is provided. The pressure member holds a second centering member to be inserted into a center hole of a circular substrate disposed on the non-contact side of the disk (i.e., the side which is out of contact with a turntable). The pressure applying means includes attracting force generating means for attracting the pressure member toward the turntable: and position select/hold means is also provided. When a support member for supporting the pressure member is at a non-clamping position farthest from the turntable, the position select/hold means holds the pressure member at a position apart from the disk carrying surface of the turntable. When the support member is at a first clamping position which is a middle position and a second position which is closest to the turntable, the position select/hold means is out of contact with the pressure member. Further, with the movement of the support member between the first clamping position and the second clamping position, the position select/hold means positions the second centering means at an insertion allowing position where the second centering means is allowed to be inserted into the center hole of the circular substrate, and an insertion prohibiting position where the second centering means is prohibited from being inserted thereinto. When the support member is at the second position and the second centering member is at the insertion allowing position, the second centering member is closer to the support member than the disk contact member.

With such an arrangement, the disk is clamped on the turntable by a constant attracting force as generated by the attracting force generating means. When the support member is moved from the first clamping position to the second clamping position, it is made to nonresiliently engage with the second centering member.

DETAILED DESCRIPTION OF THE PREFERRED EMBODIMENTS

Some specific embodiments of the dual-side use disk player according to the present invention will now be described with reference to the accompanying drawings.

A dual-side use disk player according to a first embodiment of the present invention is illustrated in FIGS. 4-8.

Figure 1:
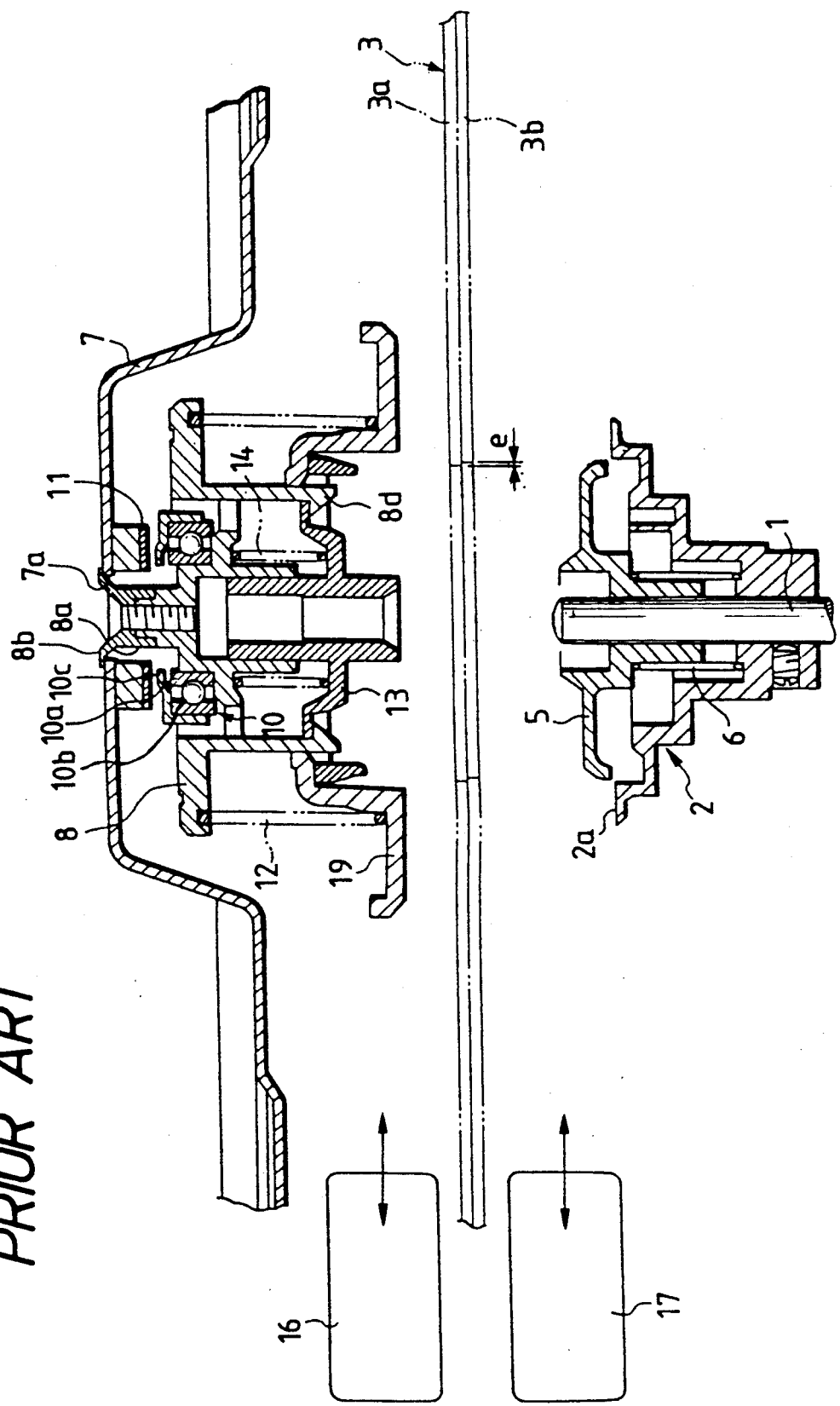
FIG. 1 is a longitudinal sectional view showing a disk clamping mechanism and a disk centering means, which form a key portion of a prior art dual-side use disk player.
Figure 2:
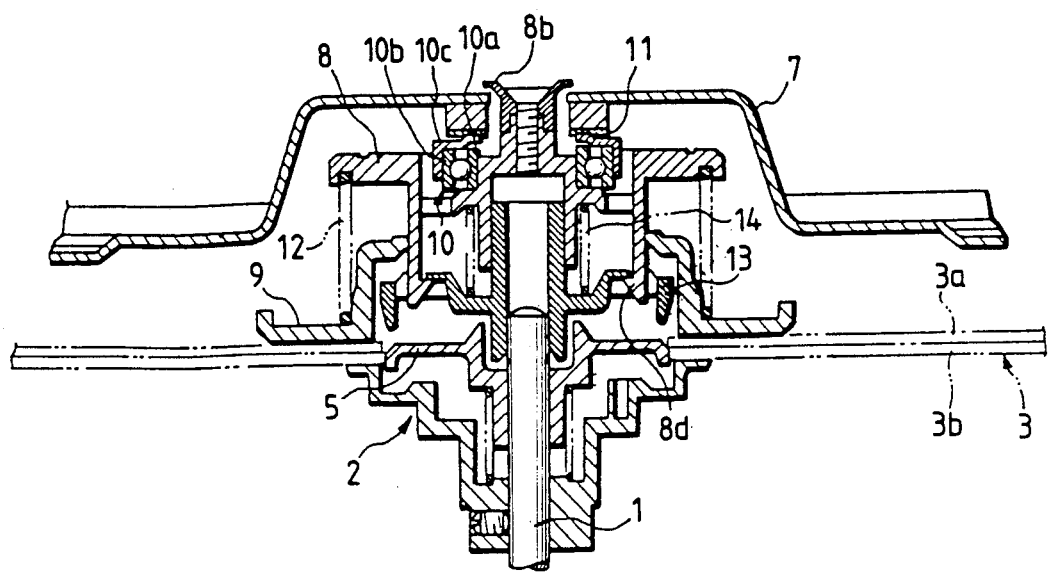
FIGS. 2 and 3 show sectional views of the disk player of FIG. 1, which are useful in explaining the operation of the clamping mechanism and the disk centering means.
Figure 3:
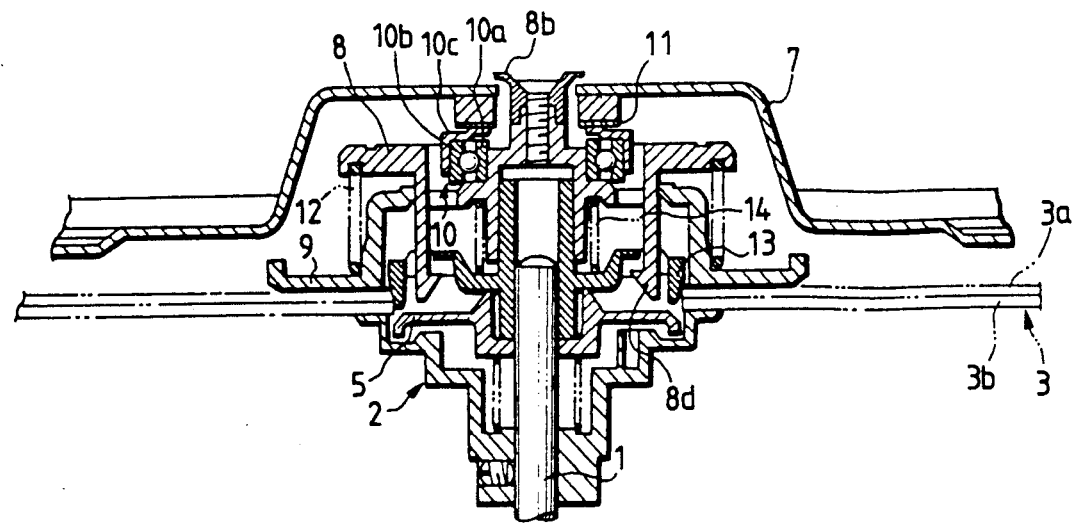
Figure 4:
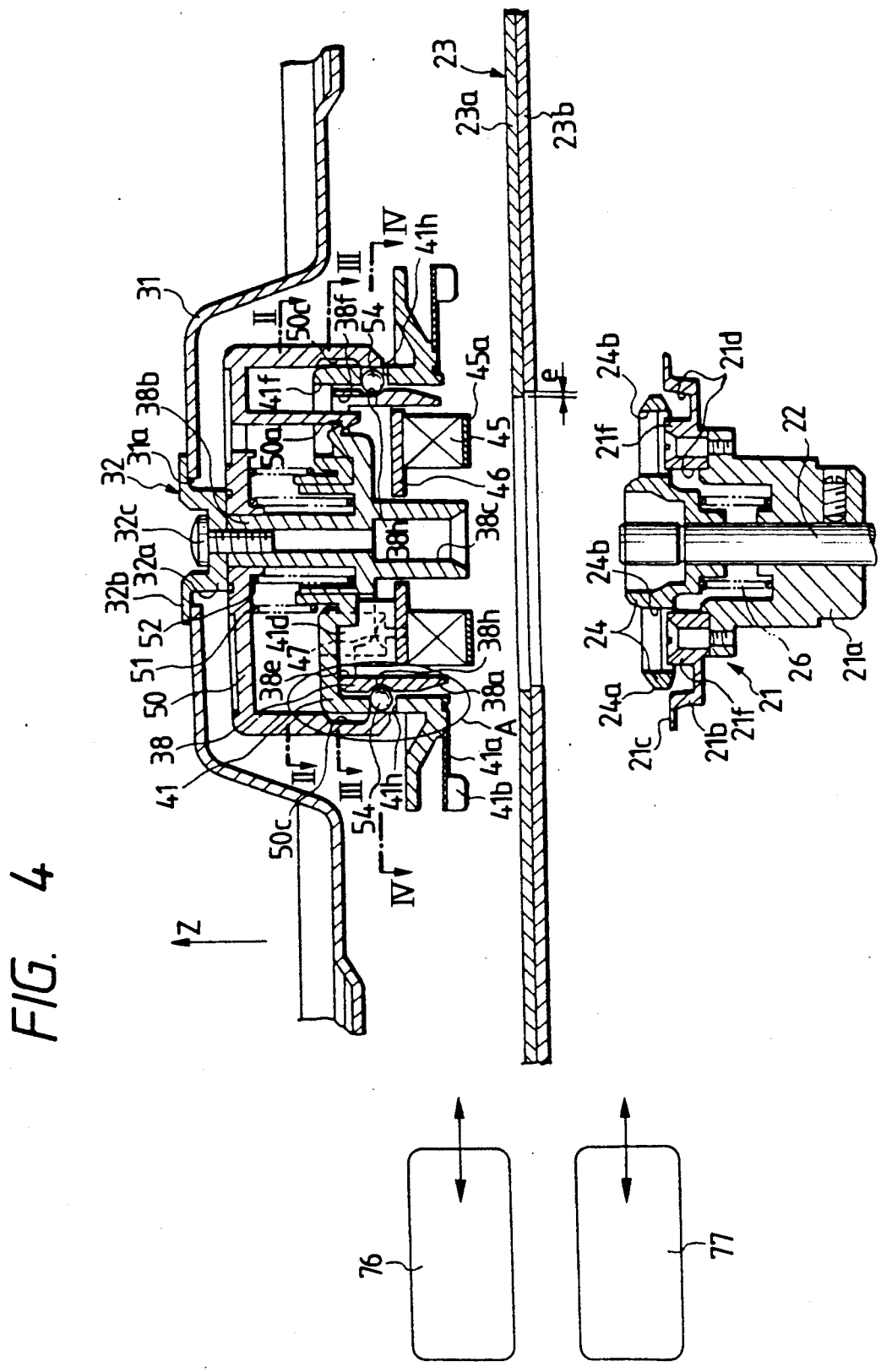
FIG. 4 is a longitudinal sectional view showing a disk clamping mechanism and a disk centering means, which form a key portion of a dual-side use disk player according to a first embodiment of the present invention.

As shown in FIG. 4, the turntable 21 includes a base portion 21a and a disk support 21b. The turntable 21 is fastened at the base portion 21a to a spindle shaft 22 of a spindle motor, and is rotated together with the shaft. A disk 23 to be placed on the turntable 21 is made up of a pair of circular substrates 23a and 23b respectively having recording layers, which are bonded together with the recording layers being laid inside the substrates. The circular substrates 23a and 23b, coupled together, are displaced in the radial direction by a distance "e".

A disk support surface 21c of the turntable 21 has a recessed area 21d. A first centering member 24 is placed in the recessed area, and is vertically movable along the axis of the turntable 21. The first centering member 24 is slidably disposed around the spindle shaft 22 and is guided by the shaft when it slides. The first centering member 24 has a tapered portion 24a along its circumference. To center the circular substrate 23b on the turntable 21, the tapered portion 24a of the first centering member 24 is fitted into the center hole of the substrate 23b of the disk 23, the substrate 23b being in contact with the disk support surface 21c of the turntable 21. A coiled spring 26 is placed between the turntable 21 and the first centering member 24, and biases the first centering member in the projected direction.

A support member 31, disposed above the turntable 21, is vertically movable with respect to the disk support surface 21c of the turntable 21 (i.e., in the direction of arrow Z and in the opposite direction). A discoidal rotating member 32, which is disposed in the center portion of the support member 31, is rotatably and vertically movable. More specifically, the rotating member 32 includes a column part 32a and a flange 32b. The column part 32a of the rotating member 32 is movably inserted in an opening 31a of the support member 31. The column part 32a of the rotating member 32 is coupled with a second centering member 38 by means of a screw 32c. The second centering member 38 has a tapered portion 38a in the outer surface. The circular substrate 23a is centered on the turntable 21 by inserting the tapered part 38a into the center hole of the circular substrate 23a of the disk 23, the substrate 23a not being in contact with the disk support surface 21c of the turntable 21. The second centering member 38 has a tubular part 38b in the center portion. The second centering member 38 is centered on the turntable 21 by placing a center hole 39c of the tubular part around the top end of the spindle shaft 22.

A disk contact member 41, which contacts the disk 23 placed on the turntable 21 so as to push the disk, is slidably coupled with the tubular part 38b of the second centering member 38. The disk contact member 41, together with the rotating member 32, forms a pushing means to push the disk 23 toward the turntable 21.

A ring-like plate spring 41a is mounted around the circumference of the open end of the disk contact member 41 in a cantilever fashion. A member 41b made of high friction material, e.g., rubber, is fixed to the circumferential end, or the free end of the plate spring 41a. The disk contact member 41 comes in contact with an area of the disk 23 in the vicinity of the circular substrates 23a and 23b making up the disk.

Figure 5:
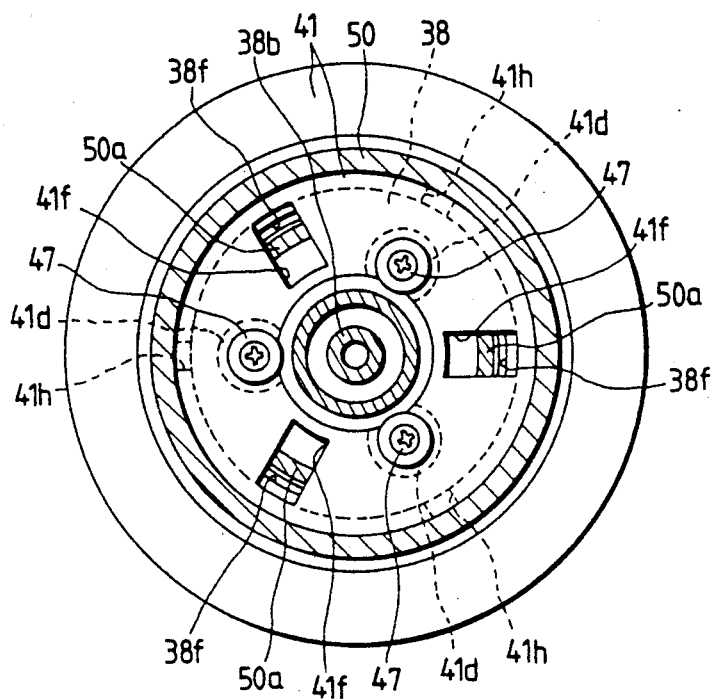
FIGS. 5-7 show cross sectional views taken along lines II—II, III—III and IV—IV of FIG. 4.
Figure 6:
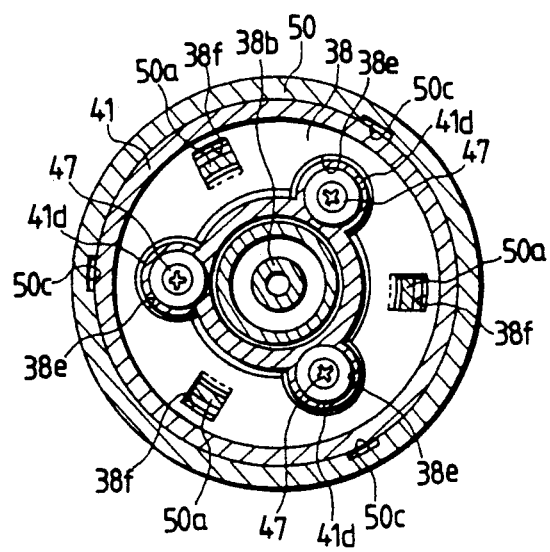
Figure 7:
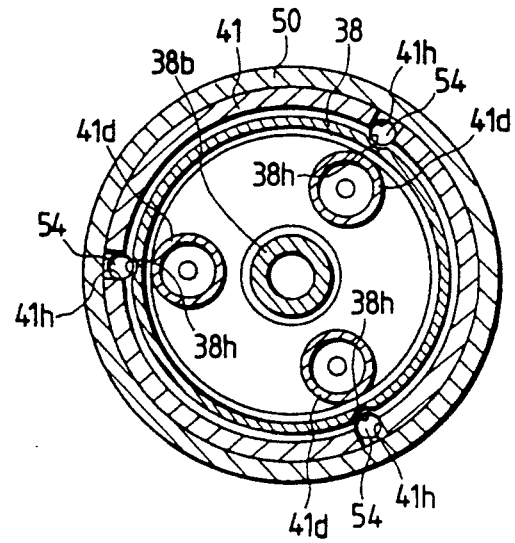

As shown in FIGS. 5 through 7, three poles 41d, which are fixed on the inner surface of the disk contact member 41, and extend toward the turntable 21, are arranged equidistantly and coaxially with the disk contact member 41. These poles 41d are respectively inserted into circular openings 38e formed in the major surface of the second centering member 38. A ring-like yoke plate 46 holding a magnet 45 is fastened to the top end of each pole 41d by means of a screw 47.

The disk support 21b partially constituting the turntable 21 is made of magnetic material. The magnet 45 cooperates with the disk support 21b to form an attractive force generating means. The attractive force generating means attracts the pushing means toward the turntable 21, to give a disk pushing force to the pushing means. The disk support 21b of the turntable 21 is provided with a column part 21f to be attracted by the magnet 45. The magnet 45 attracts the column part 21f through an opening 24b formed in the second centering member.

A gap sheet 45a of nonmagnetic material is bonded onto the attracting surface of the magnet 45. When the magnet attracts the column part 21f of the disk support 21b. the gap sheet 45a intervenes between the magnet 45 and the column part 21f.

A slider 50 shaped like a bowl is disposed between the rotating member 32 and the disk contact member 41 and is slidably mounted to the tubular part 38b of the second centering member 38. A coiled spring 51 is placed between the slider 50 and the disk contact member 41. Another coiled spring 52, placed between the slider 50 and the second centering member 38, pushes the second centering member toward the turntable 21. The second centering member 38 is supported by means of, for example, three lugs 50a of the slider 50. More specifically, as shown also in FIGS. 5 and 6, three small rectangular openings 38f are formed in the major surface of the second centering member 38, and the openings are arranged equidistantly and coaxially with the second centering member 38. The lugs 50a are fitted in the openings 38f, respectively.

The disk contact member 41 is shaped like a bowl, and opened toward the disk support surface 21c of the turntable 21. The second centering member 38 is also shaped like a bowl, as a whole. The second centering member 38 is inserted in the disk contact member 41, and is movable along the axis of the rotating member 32. The lugs 50a, which are projected from the slider 50 and hold the second centering member 38, pass through the openings 41f of the disk contact member 41, respectively. With such a structure, the lugs 50a of the slider 50 hold the disk contact member 41 as well as the second centering member 38. Therefore, there is no need for a holding means exclusively used for the holding of the disk contact member 41 by the slider 50.

Figure 8:
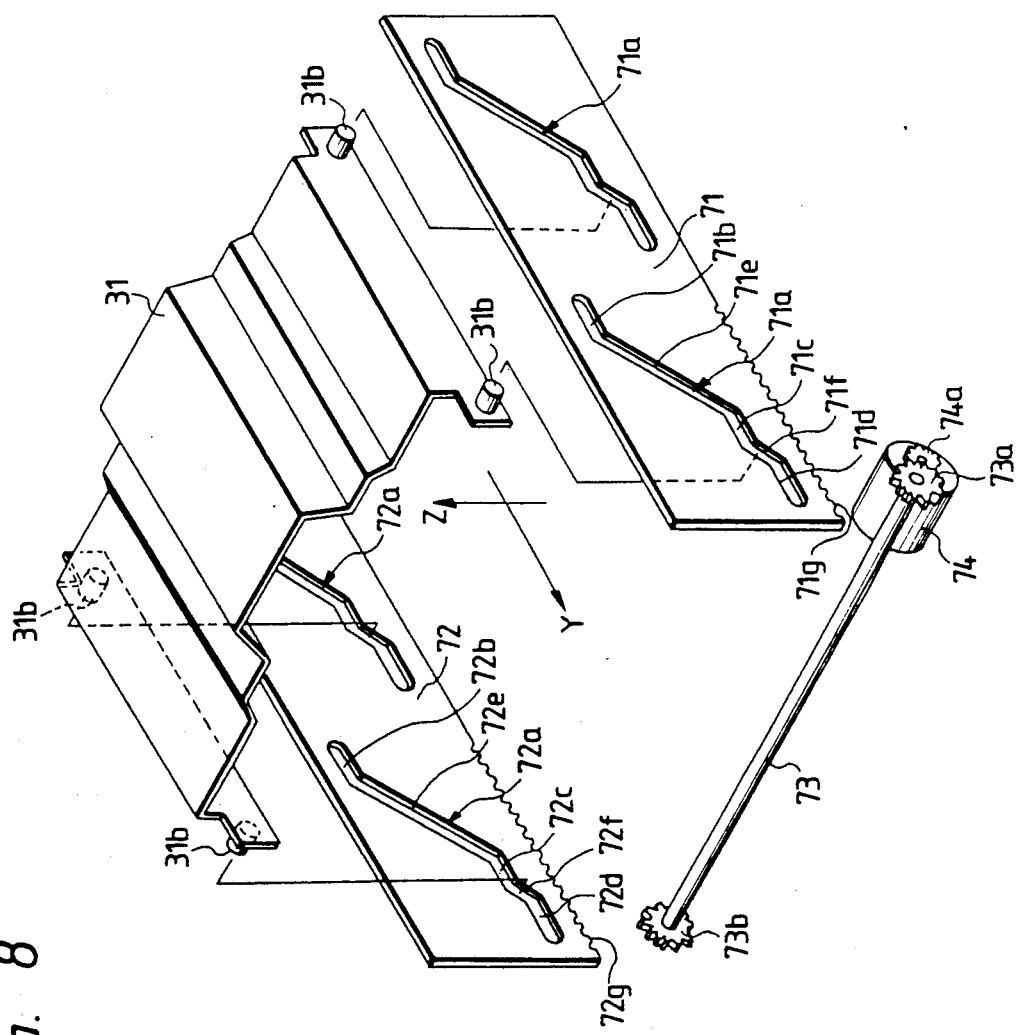
FIG. 8 shows a perspective view of the disk clamping mechanism shown in FIG. 4.

As best illustrated in FIG. 8, a pair of moving members 71 and 72 each shaped like a rectangular plate are disposed on both sides of the support member 31, and are reciprocatingly movable back and forth (in the direction of arrow Y and in the opposite direction). Two pins 31b are mounted on each of the side walls of the support member 31, and, accordingly, the support member 31 has a total of four pins 31b. The two pairs of support members slidably engage with cam slits 71a and 72a of the moving members 71 and 72. As shown, the cam slits 71a and 72a are slanted downwardly (or in the direction opposite to the direction of arrow Z) toward the front (direction of arrow Y). Accordingly, when the moving members 71 and 72 are moved back and forth, the support member 31 is vertically moved.

The cam slit 71a consists of three horizontal segments 71b–71d and two slanted segments 71e and 71f contiguous to and slanted with respect to the horizontal segments. The cam slit 72a also consists of three horizontal segments 72b–72d, and two slanted segments 72e and 72f contiguous to and slanted with respect to the horizontal segments. Each of the cam slits 71a and 72a is shaped in a step-like arrangement. Accordingly, when the moving members 71 and 72 are moved, the support member 31 is moved in two steps.

The lower edge of the front part of the moving member 71 serves as a rack 71g. Similarly, the lower edge of the front part of the moving member 72 serves as a rack 72g. A synchronizing shaft 73 is rotatingly provided close to the moving members 71 and 72. Gears 73a and 73b, which are mounted to both ends of the synchronizing shaft, are in mesh with the racks 71g and 72g. The gear 73a of the above-noted gears engages with a gear 74a, which is coupled with the output shaft of a motor 74. When the motor 74 is driven, the support member 31 is vertically moved.

The moving members 71 and 72, the synchronous shaft 73, and the motor make up a positioning means. The positioning means is for positioning the support member 31 at three positions; a non-clamping position as shown in FIG. 4 where the support member 31 is positioned farthest from the disk support surface 21c of the turntable 21, and first and second clamping positions to be described later.

Figure 9:
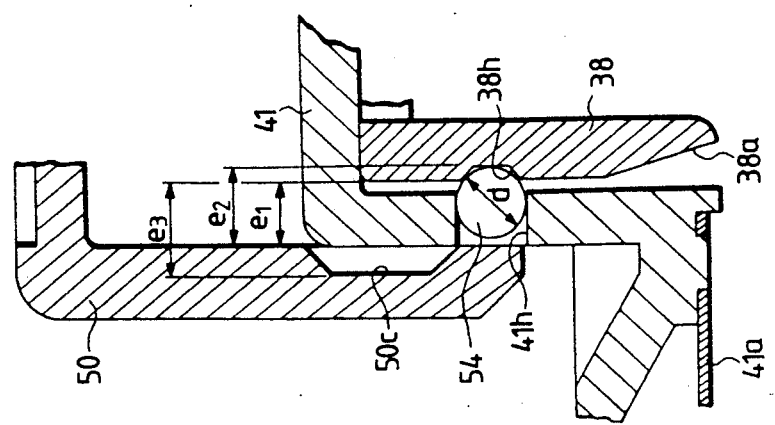
FIG. 9 shows an enlarged view of a circular portion in each of the drawings of FIGS. 4-8.

As seen from FIGS. 4, 6 and 9, a plurality of concave portions 50c such as three, for example, are formed in the inner circumferential surface of the slider 50 which faces the outer circumferential surface of the disk contact member 41. The concave portions 50c are arrange equidistantly as viewed in the circumferential direction. As seen from FIGS. 4, 7 and 9, three concave portions 38h are formed in the outer circumferential surface of the second centering member 38 which faces the inner circumferential surface of the disk contact member 41. The concave portions 38h are arranged equidistantly as viewed in the circumferential direction. When the slider 50 is at a first position as shown in FIG. 4 the concave portions 50c and 38h do not confront with each other. When the slider 50 descends from the first position toward the turntable 21 by a predetermined distance, the concave portions confront with each other. As seen from FIGS. 4, 5, 7 and 9, an opening 41h is formed in the circumferential wall of the disk contact member 41, which is located between the circumferential wall of the second centering member 38 and the slider 50. The concave portions 50c and 38h are arranged to face each other through the opening 41h. A round body 54 is movably disposed in the opening 41h and is arranged to engage with the concave portions 50c and 38h.

In FIG. 9, a distance $e_1$ between the inner circumferential wall of the slider 50 and the outer circumferential wall of the second centering member 38 is shorter than a diameter "d" of the round body 54. A distance $e_2$ between the inner peripheral surface of the slider 50 and the bottom of the concave portion of 38h is slightly larger than the diameter "d". A distance $e_3$ between the bottom of the concave portion 50c of the slider 50 and the outer circumferential surface of the second centering member 38 is also slightly larger than the diameter "d". With such a structure, when the circumferential wall of the slider 50 is moved relative to that of the second centering member 38, about half of the round body, which is placed within the opening 41h of the disk contact member 41, is selectively placed into the concave portions 50c and 38h.

A position select/hold means is made up of the concave portions 50c and 38h of the slider 50 and the second centering member 38, the opening 41h of the disk contact member 41, the round body 54, and the coiled springs 51 and 52 biasing the slider 50 in the direction opposite to the turntable 21. With the movement of the support member 31 between the first and the second clamping positions, the position hold/select means positions the second centering member 38 at an insertion allowing position where the second centering member 38 is allowed to be inserted into the center hole of the circular substrate 23a, and at an insertion prohibiting position where the second centering member 38 is prohibited from being inserted into the center hole of substrate 23a.

As shown in FIG. 4, a pair of optical pick-ups 76 and 77 are disposed above and below the disk 23 which is placed on the turntable 21. The pick-ups are moved along the recording layers of the disk 23 by means of a guide drive means, and attendantly pick up the data from the signal recording layers on the circular substrates 23a and 23b, respectively.

The operation of the dual-side use disk player thus arranged will now be described with reference to the figures as mentioned above and also FIGS. 10 and 11.

To play back data from the signal recording layer of the circular substrate 23b, the circular substrate 23b being in contact with the disk support surface 21c of the turntable 21, the motor 74 shown in FIG. 8 is rotated to move the moving members 71 and 72 supporting the support member 31 from a start position of their movement stroke to a middle position. As a result, the support member 31 is moved from the non-clamping position as shown in FIG. 4 toward the turntable, and is positioned at the first clamping position which is the middle position shown in FIG. 10. When the support member 31 is at the non-clamping position as shown in FIG. 4, the pushing means made up of the rotating member 32 and the disk contact member 41 is held apart from the disk support surface 21c of the turntable 21.

When the support member 31 is moved from the nonclamping position of the support member 31 to the first clamping position, the magnet 45 attracts the disk support 21b of the turntable 21, so that the disk contact member 41 is pressed against the disk 23. At the same time, the first centering member 24 is inserted into the center hole of the circular substrate 23b, so that the disk 23 is slightly moved in the radial direction, to thereby be centered on the turntable 21. Under this condition, the support member 31 detaches from the pushing member made up of the rotating member 32 and the disk contact member 41. Accordingly, a pushing force applied to the disk 23 consists of only an attracting force developed between the magnet 45 and the disk support 21b.

Under this condition, the turntable 21 is forwardly rotated, and the lower side pick-up 77, as shown in FIG. 4, picks up data from the recording layer on the circular substrate 23b.

At this time, the round body 54 is placed in the concave portion 38h of the second centering member 38. Accordingly, the member 38 is stopped at the disk contact member 41.

To play back data from the recording layer of the circular substrate 23a which is currently out of contact with the disk support surface 21c of the turntable 21, the motor 74 shown in FIG. 8 is further rotated and the moving members 71 and 72 are moved from the middle position in the movement stroke to the final position. The support member 31 is made to further approach the turntable 21. As a result, it is moved from the first clamping position (FIG. 10) to the second clamping position indicated by a solid line in FIG. 11. At this time, the round body 54 is still positioned in the concave portion 38h of the second centering member 38. The second centering member 38 is stopped at the disk contact member 41. It is at the insertion prohibiting position where it is prohibited from being inserted into the center hole of the circular substrate 23a. Afterwards, the motor 74 is slightly rotated, to bring the support member 31 to a position indicated by an alternate long and two short dash line shown in FIG. 11. As a result, the slider 50 is pushed down from the first position to the second position, the concave portion 50c of the slider 50 reaches such a position as to receive the round body 54. At the same time, the second centering member 38 supported by the lug 50a of the slider 50 is inserted into the center hole of the circular substrate 23a by means of the coiled spring 52 which has been compressed due to the descending of the slider 50. With the wedge action of second centering member 38, the disk 23 is slightly moved in the radial direction. At the same time, the circumferential portion of the second centering member 38 engages with and pushes down the first centering member 24. Accordingly, the first centering member 24 is moved out of the center hole of the circular substrate 23b, and moves below the level of the disk support surface 21c of the turntable 21. With the descending of the second centering member 38, the round body 54 moves out of the concave portion 38h of the second centering member 38 and is placed into the concave portion 50c of the slider 50. As a result, the slider 50 is stopped at the disk contact member 41, so that the second centering member 38 is inserted into the center hole of the circular substrate 23a, and is fixed there. In this way, the circular substrate 23a is centered on the turntable 21.

Incidentally, the pressure at this time applied to the disk 23 is the sum of an attraction between the magnet 45 and the disk support 21b and a force due to a flexure of the coiled spring 52. The coiled spring 52 acts to merely bias the slider 50 upwardly (in the direction of "z"), and its spring constant is small. Further, it is not flexed until a transient process from the FIG. 10 state to the FIG. 11 state is set up. A disk pushing force in this state is set to be equal to that in the state of FIG. 10, viz., when the circular substrate 23b is centered. The disk 23 is readily moved on the turntable 21 due to the wedging action of the support member 38 when it is inserted into the center hole of the circular substrate 23a.

Figure 11:
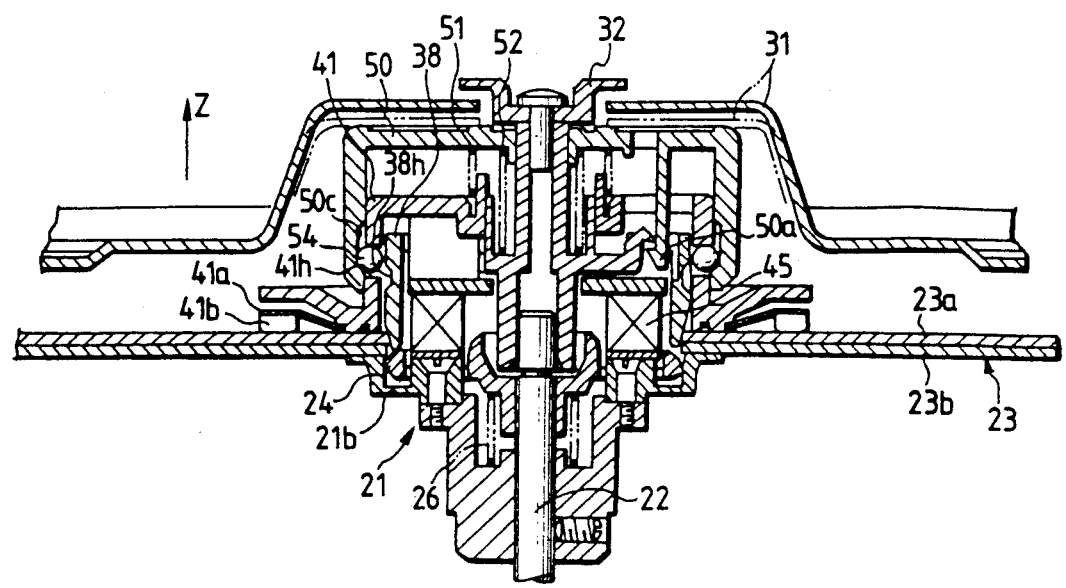

When the circular substrate 23a is centered on the turntable 21, the motor 74 is slightly rotated in the reverse direction, to return the support member 31 to the second position indicated by the solid line in FIG. 11. Under this condition, it comes out of contact with the pressure member made up of the rotating member 32 and the disk contact member 41. Then, the turntable 21 is reversely rotated, and the pick-up 76 disposed above the disk 23 picks up data from the recording layer on the circular substrate 23a.

Figure 10:
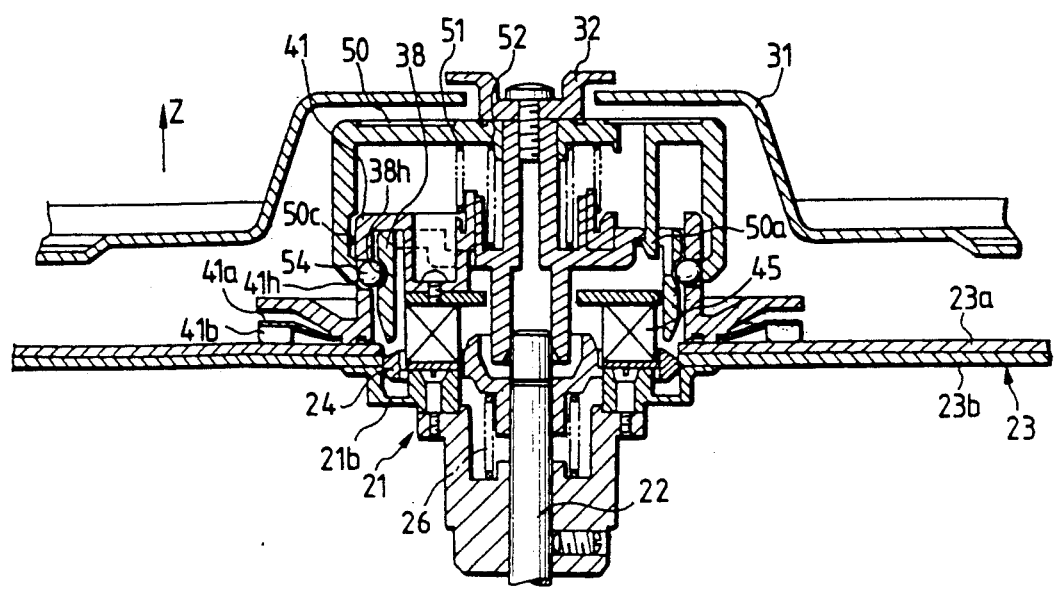
FIGS. 10 and 11 show sectional views of the disk player of FIG. 4, which are useful in explaining the operation of the clamping mechanism and the disk centering means.

Thereafter, to again play back the data from the recording layer on the substrate 23b the motor 74 is reversely rotated to lift the support member 31 from the second clamping position indicated by a solid line in FIG. 11 to the first clamping position shown in FIG. 10. With the lifting of the support member 31, the rotating member 32 is pushed up, and in turn the second centering member 38 is lifted out of the center hole of the circular substrate 23a. At the same time, the biasing force by the coiled spring 26 causes the first centering member 24 to move up and above the disk support surface 21c of the turntable 21. As a result, the circular substrate 23b is centered again. With the lift of the second centering member 38, its concave portion 38h reaches the position receiving the round body 54. Then, the coiled springs 51 and 52 cooperate to lift the slider 50. The round body 54 departs from the concave portion 50c of the slider 50 and enters the concave portion 38h, The state of FIG. 10 is thus set up. Subsequently, as in the previous case, the turntable 21 is forwardly rotated, and the lower side pick-up 77 picks up data from the recording layer on the circular substrate 23b.

As seen from the foregoing description, when the support member 31 is moved from the first clamping position of FIG. 10 to the second clamping position of FIG. 11, it temporarily engages with the pressure member including the rotating member 32 and the disk contact member 41, through the slider 50. Conversely, when moved from the second clamping position to the first clamping position, support member 31 directly engages with the rotating member 32 partially constituting the pressure member. As previously noted, when the data is played back from the recording layers on the circular substrates 23a and 23b, which make up the disk 23, the rotational direction of the turntable 21 for one substrate is reverse to that for the other. When for the disk substrates 23a and 23b. a selection is made between the disk clamping state and the centering state, the support member 31 engages with the pressure member. Under this condition, the rotation of the turntable 21 is braked. Accordingly, the turntable 21 is braked instantly, eliminating the continuous rotation of the turntable due to its inertia. Accordingly, selection can quickly be made between the playback of the substrate 23a data and the playback of the substrate 23b data.

Figure 12:
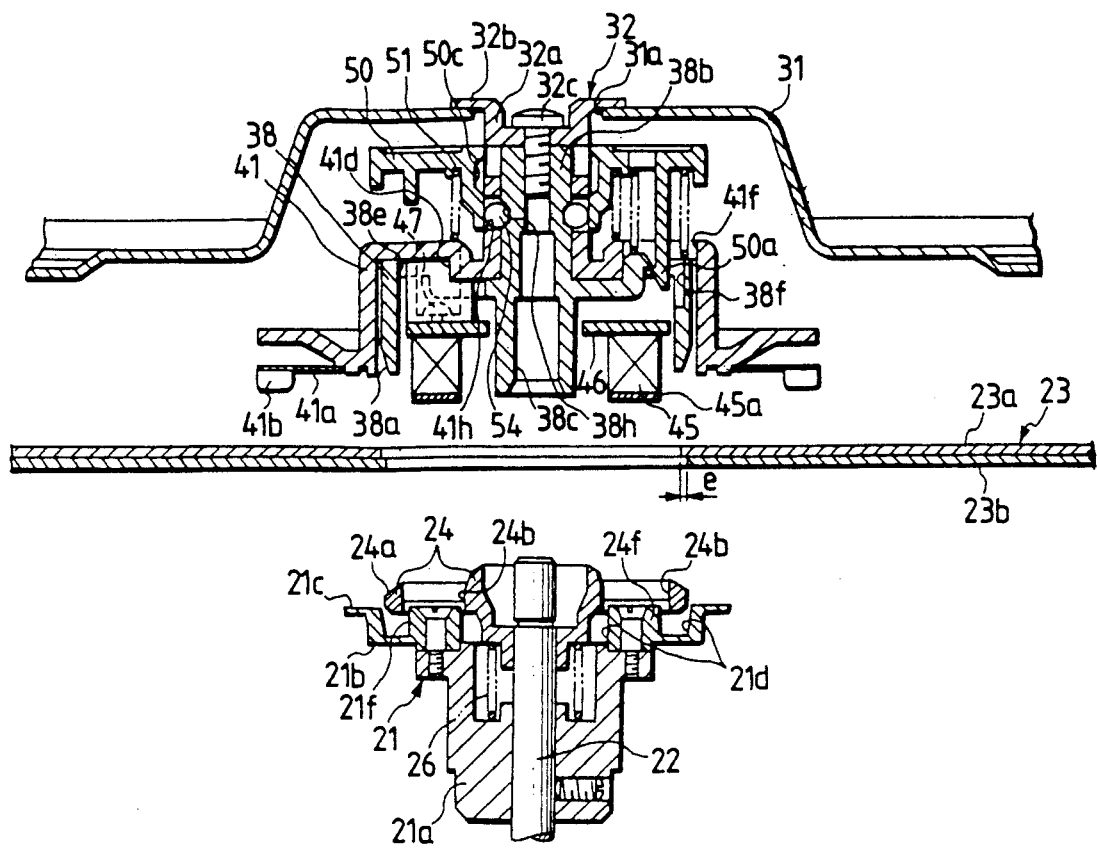
FIG. 12 is a longitudinal sectional view showing a disk clamping mechanism and a disk centering means, which form a key portion of a dual-side use disk player according to a modification of the first embodiment of the present invention.

A modification of the dual-side use disk player as illustrated in FIGS. 4 through 11 is illustrated in FIG. 12. As previously noted, in the disk player shown in FIGS. 4 through 11 the position select/hold means including the round body 54, and the like is provided near the circumference of the disk contact member 41 and the second centering member 38. In the modification, on the other hand, the position select/hold means is disposed near the axis of the slider 50. With such a structure, the slider 50 may be constructed with a small planar member, as opposed to the bowl-like member of the disk player shown in FIGS. 4-11. This leads to a reduction of the size of the entire player. The remaining portions of the modification are substantially the same as those of the disk player shown in FIGS. 4-11. Hence, no further description of them will be given.

Figure 13:
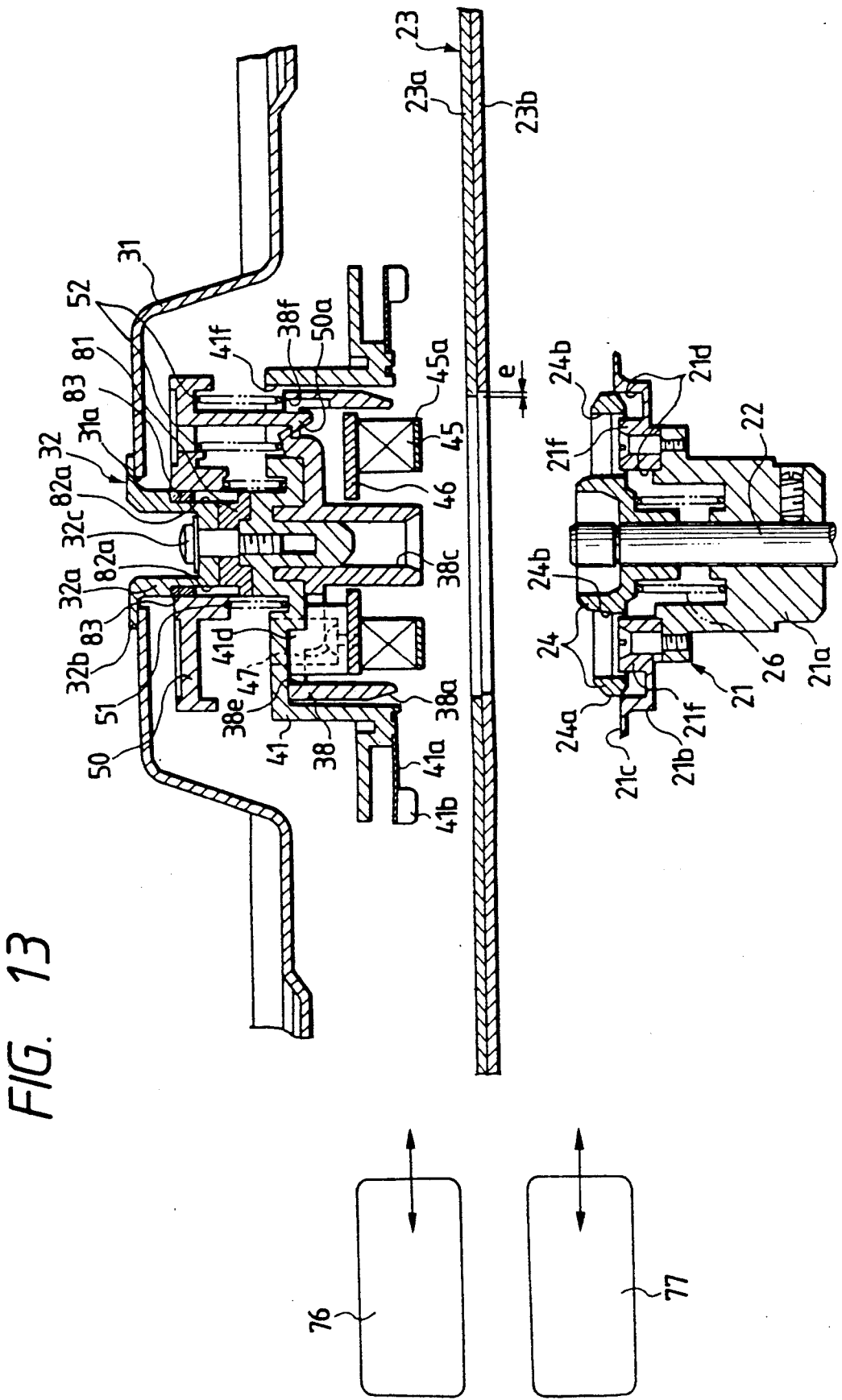
FIG. 13 is a longitudinal sectional view showing a disk clamping mechanism and a disk centering means, which form a key portion of a dual-side use disk player according to a second embodiment of the present invention.

FIG. 13 shows a sectional view of a dual-side use disk player according to a second embodiment of the present invention. The portions other than the structure to be described below are substantially the same as those of the disk players shown in FIGS. 4-11, and FIG. 12. Hence, the description of them will be omitted, with the designation of like or equivalent portions by like reference numerals.

As illustrated in FIG. 13, in the disk player, the disk contact member 41 to be in contact with the disk 23 is fastened to the rotating member 32 with a discoidal intermediate member 81 interposed therebetween. A screw 32c is used for fastening the member 32. The second centering member 38, which engages with the circular substrate 23a and centers it, is slidably mounted on the disk contact member 41.

Figure 14:
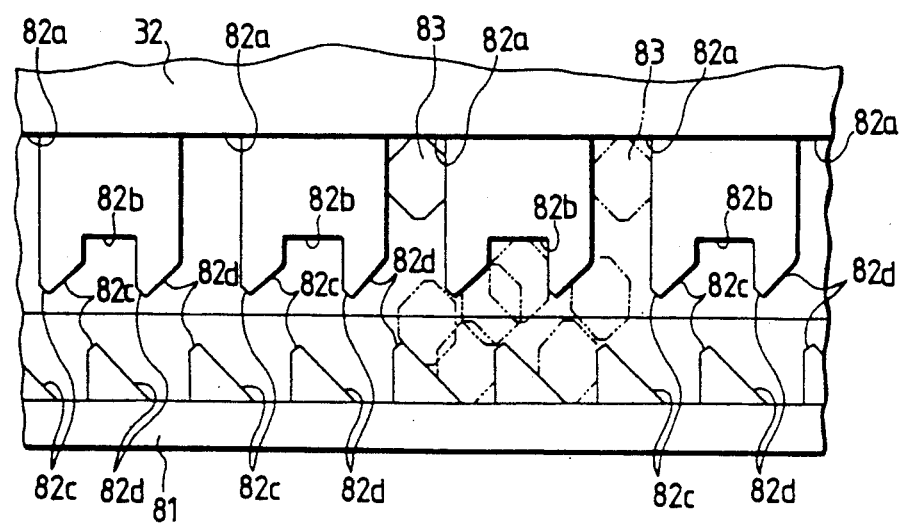
FIG. 14 shows a side view of a part of the disk centering means shown in FIG. 13.

As best illustrated in FIG. 14, two types of stopper grooves 82a and 82b which extend in the axial direction of the rotating member 32 and are six in number, respectively, are formed equidistantly as viewed circumferentially on the circumferential surfaces of the rotating member 32 and the intermediate member 81. Three sliding bodies 83 are slidably disposed in the stopper grooves 82a and 82b, and are fixed onto the slider 50 equidistantly as viewed circumferentially. As shown in FIG. 14, in addition to the stopper grooves 82a and 82b, guide grooves 82c and 82d are formed on the circumferential surfaces of the rotating member 32 and the intermediate member 81. The guide groove 82c guides the sliding body 83 from the stopper groove 82a to another type of stopper groove 82b. The guide groove 82d guides the sliding body 83 reversely, i.e., from the stopper groove 82b to the stopper groove 82a.

The stopper grooves 82a and 82b, the guide grooves 82c and 82d, and the sliding body 83 cooperate to make up a position select/hold means. With the movement of the support member 31 between the first clamping position and the second clamping position the position select/hold means positions the second centering member 38 at the insertion allowing position where the member 38 is allowed to be inserted into the center hole of the circular substrate 23a, and at the insertion prohibiting position where the member is prohibited from being inserted.

The operation of the disk player thus structured will now be described with reference to the above drawings and FIGS. 15 and 16 as well.

To play back data from the signal recording layer of the circular substrate 23b, the circular substrate 23b being in contact with the disk support surface 21c of the turntable 21, the motor 74, as shown in FIG. 8, is turned to move the moving members 71 and 72 supporting the support member 31 from a start position of their movement stroke to a middle position. As a result, the support member 31 is moved from the non-clamping position as shown in FIG. 13 toward the turntable, and is positioned at the first clamping position which is the middle position shown in FIG. 15. When the support member 31 is at a non-clamping position as shown in FIG. 13, the pushing means made up of the rotating member 32 and the disk contact member 41 is held apart from the disk support surface 21c of the turntable 21, so that the disk contact member 41 is pressed against the disk 23. At the same time, the first centering member 24 is inserted into the center hole of the circular substrate 23b, so that the disk 23 is slightly moved in the radial direction, to thereby be centered on the turntable 21. Under this condition, the support member 31 detaches from the pushing member made up of the rotating member 32 and the disk contact member 41. Accordingly, a pushing force applied to the disk 23 consists of only an attracting force developed between the magnet 45 and the disk support 21b.

Under this condition, the turntable 21 is forwardly rotated and the lower side pick-up 77, as shown in FIG. 4, picks up data from the recording layer on the circular substrate 23b. At this time, sliding body 83 is positioned at the position as indicated by a solid line in FIG. 14, viz., the upper end of the stopper groove 82a.

To play back data from the recording layer of the circular substrate 23a which is currently out of contact with the disk support surface 21c of the turntable 21, the motor 74, as shown in FIG. 8, is further rotated and the moving members 71 and 72 are moved from the middle position in the movement stroke to the initial position. The support member 31 is made to further approach the turntable 21. As a result, it is moved from the first clamping position (FIG. 15) to the second clamping position as shown in FIG. 16. At this time, the sliding body 83 is still placed at the upper end of the stopper groove 82a. The second centering member 38 is stopped at the disk contact member 50. It is at the insertion prohibiting position where member 38 is prohibited from being inserted into the center hole of the circular substrate 23a. Afterwards, the motor 74 is slightly rotated, to bring the support member 31 to a position indicated by an alternate long and two short dash line as shown in FIG. 16. As a result, the slider 50 is pushed down from the first position (FIG. 15) to the second position (FIG. 16). Then, the motor 74 is slightly rotated in the reverse direction, to return the support member 31 to the second position indicated by the solid line in FIG. 16. Under this condition, it comes out of contact with the pressure member made up of the rotating member 32 and the disk contact member 41. By such an operation of the support member 31, the sliding body 83 is slid from the upper end of the stopper groove 82a and into the stopper groove 82b at the low position, by way of the guide groove 82c (FIG. 14). Thus, the slider 50 is caused to descend from the first position (FIG. 15) by a predetermined distance and is positioned at the second position (FIG. 16). Then, the second centering member 38 is inserted into the center hole of the circular substrate 23a by means of the coiled spring 52 which has been compressed due to the descending of the slider 50. With the wedge action of member 38, the disk 23 is slightly moved in the radial direction. At the same time, the circumferential portion of the second centering member 38 engaged with and pushes down the first centering member 24. Accordingly, the first centering member 24 is moved out of the center hole of the circular substrate 23b, and moves below the level of the disk support surface 21c of the turntable 21. In this way, the circular substrate 23a is centered on the turntable 21.

Incidentally, the pressure applied at this time to the disk 23 is the sum of an attraction between the magnet 45 and the disk support 21b and a force due to a flexure of the coiled spring 52. The coiled spring 52 acts to merely bias the slider 50 upwardly (in the direction of "z"). and its spring constant is small. Further, the spring 52 is not flexed until a transient process from the FIG. 15 state to the FIG. 16 state is set up. A disk pushing force in this state is set to be equal to that in the state of FIG. 15, viz., when the circular substrate 23b is centered. The disk 23 is readily moved on the turntable 21 due to the wedging action of the second centering member 38 when it is inserted into the center hole of the circular substrate 23a.

When the circular substrate 23a is centered on the turntable 21, the motor 74 is slightly rotated in the reverse direction, and the pick-up 76 disposed above the disk 23 picks up data from the recording layer on the circular substrate 23a.

Figure 15:
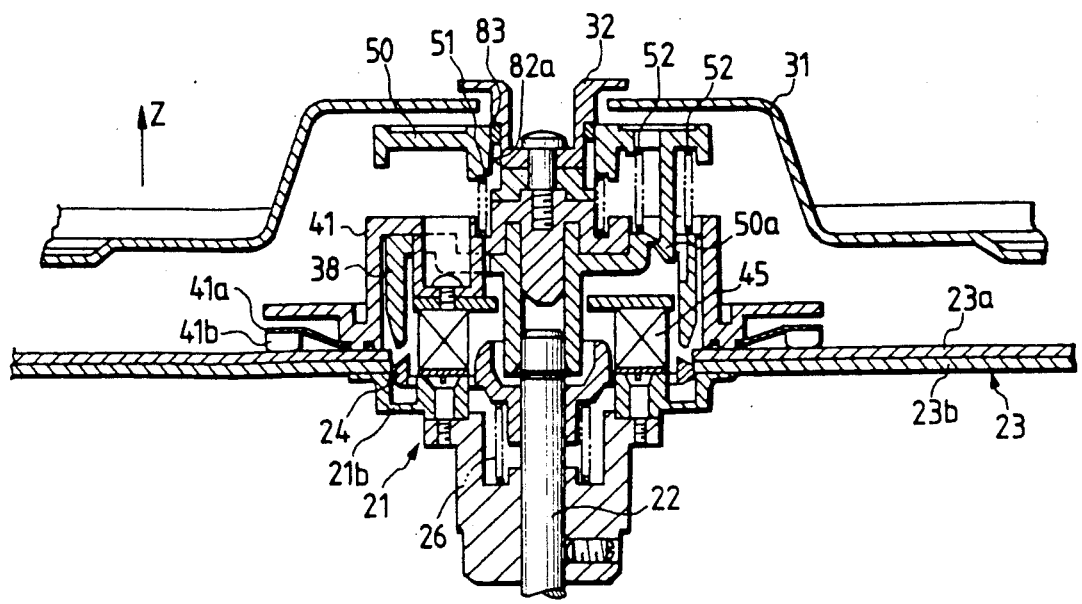
FIGS. 15 and 16 show sectional views of the disk player of FIG. 13, which are useful in explaining the operation of the clamping mechanism and the disk centering means.
Figure 16:
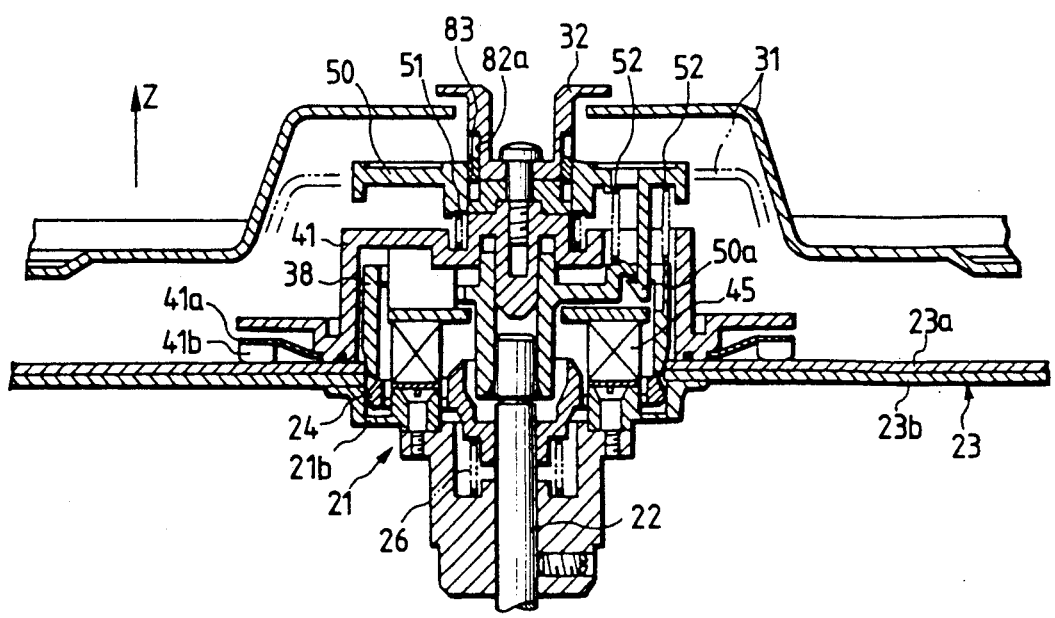

Thereafter, to again play back the data from the recording layer on the substrate 23b, the motor 74 is forwardly and reversely rotated in succession, to lift the support member 31 from the second clamping position indicate by a solid line in FIG. 16 to the first clamping position shown in FIG. 15, through a position indicated by an alternate long and two short dash line shown in FIG. 16. With the lifting of the support member 31, the sliding body 83 is slid from the low stopper groove 82b to the upper stopper groove 82a through the guide groove 82d (FIG. 14). Then, the slider 50 is lifted from the second position (FIG. 16) to the first position (FIG. 15). Accordingly, the second centering member 38 lifts to move out of the center hole of the circular substrate 23a. At the same time, the first centering member 24 is moved up above the disk support surface 23b of the turntable 21 by a biasing force applied by the coiled spring 26. Hence, the circular substrate 23b is centered again, and the state shown in FIG. 15 is set up. Subsequently, as in the previous case, the turntable 21 is forwardly rotated. and the lower side pick-up 77 picks up the data from the recording layer on the substrate 23b.

A dual-side use disk player according to a third embodiment of the present invention, will now be described with reference to FIGS. 17-21. The portions other than the structure to be described below are substantially the same as those of the disk players shown in FIGS. 4-11. Hence, the description of them will be omitted, with the designation of like or equivalent portions by like reference numerals.

In the instant embodiment, a position select/hold means is made up of the concave portions 50c and 38h of the slider 50 and the second centering member 38, the opening 41h of the disk contact member 41, the round body 54, and the coiled spring 52 biasing the slider 50 away from the turntable 21. With the movement of the support member 31 between the first and second clamping positions, the position hold/select means positions the second centering member 38 at an insertion allowing position where the second centering member 38 is allowed to be inserted into the center hole of the circular substrate 23a, and at an insertion prohibiting position where the second centering member 38 is prohibited from being inserted into the center hole.

Figure 17:
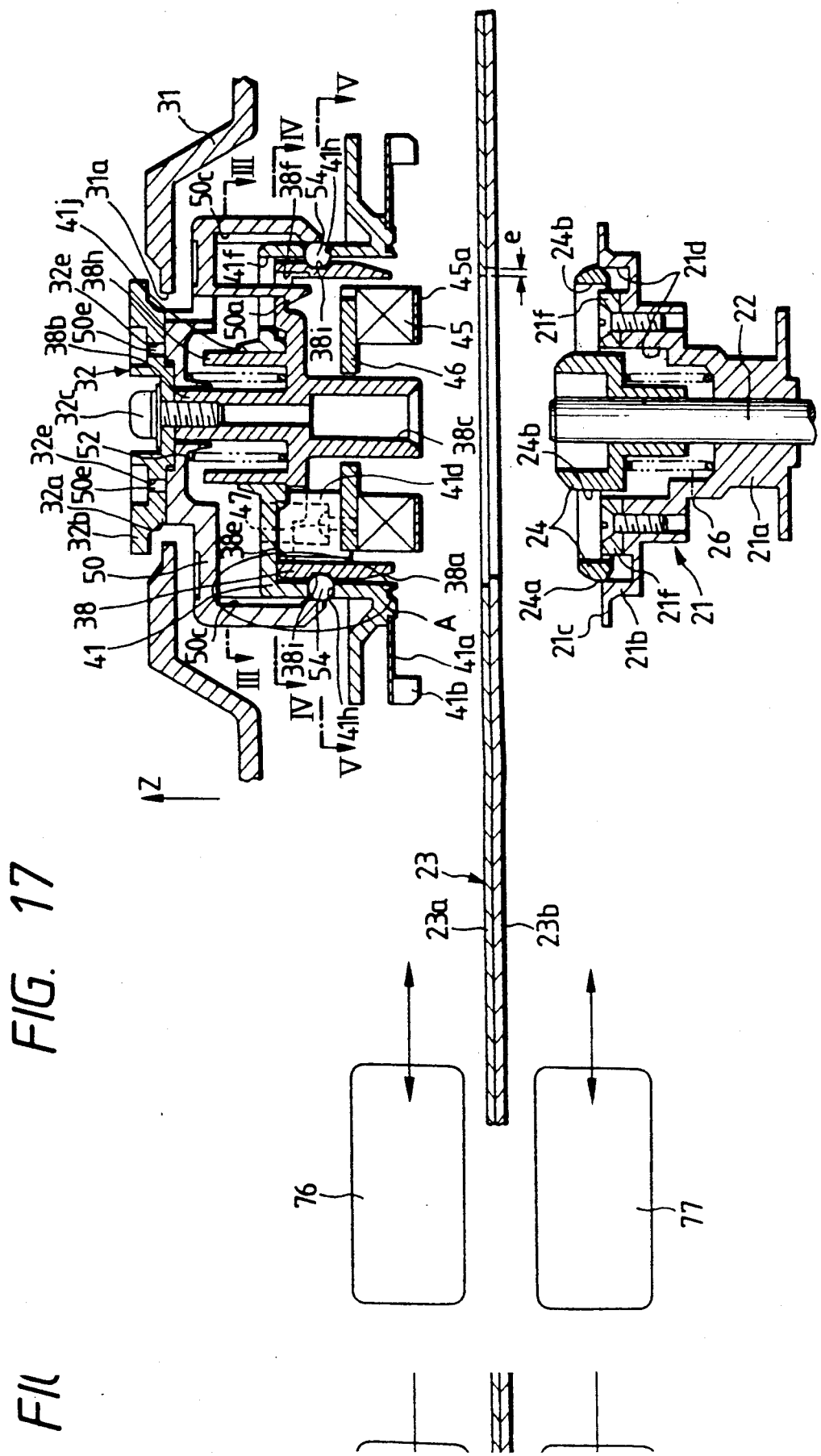
FIG. 17 is a longitudinal sectional view showing a disk clamping mechanism and a disk centering means, which form a key portion of a dual-side use disk player according to a third embodiment of the present invention.
Figure 18:
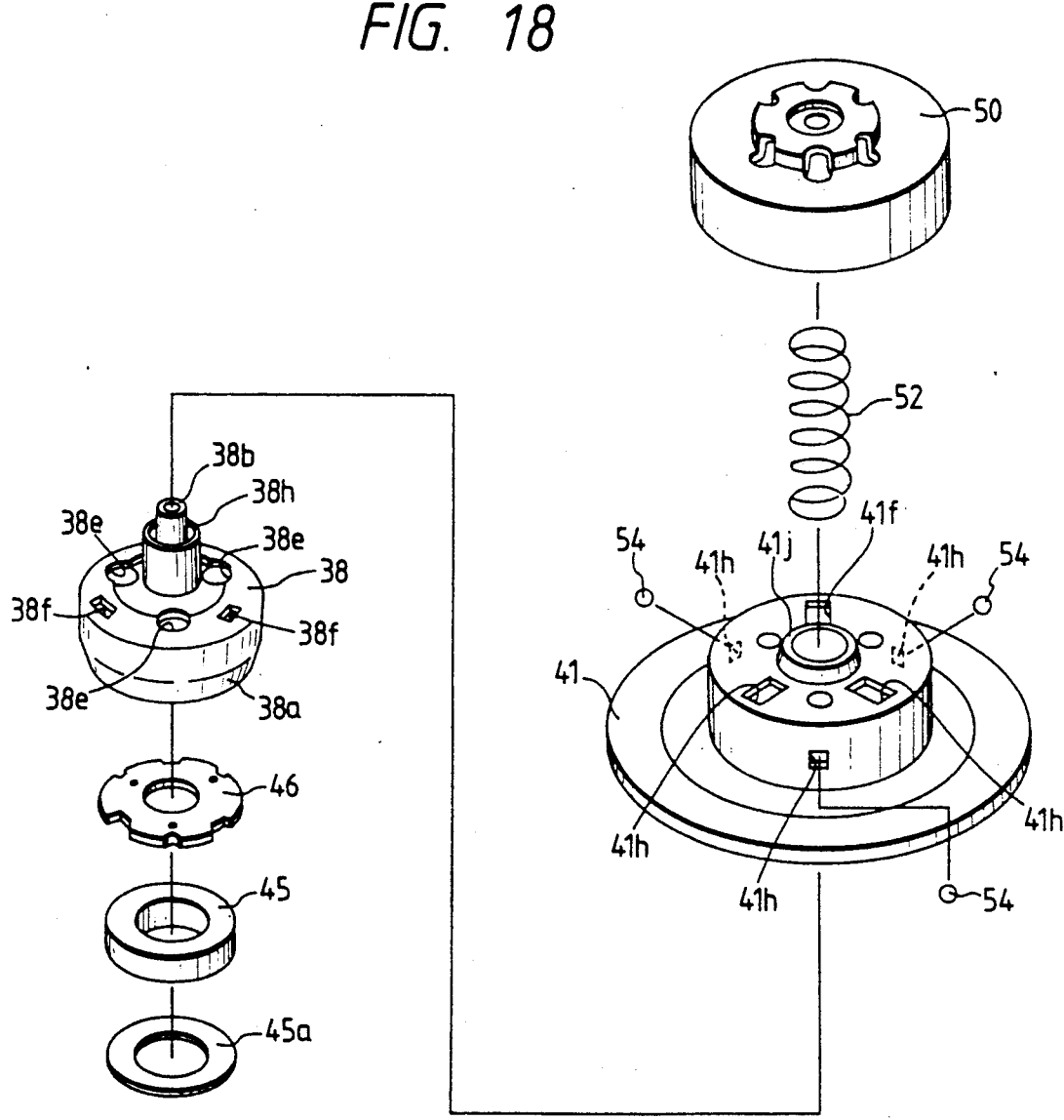
FIG. 18 shows an exploded view showing the disk clamping mechanism and the disk centering means as are shown in FIG. 17.

As shown in FIGS. 17 and 18, the second centering member 38 includes an inner part 38b having an opening 38c for receiving the spindle shaft 22, and an outer tubular part 38h disposed coaxially with and around the inner tubular part. The disk contact member 41 has a tubular part 41j, which defines an opening in the upper wall of the member 41. The tubular part 38h of the second centering member 38 is slidably fitted into the tubular part 41j of the disk contact member 41. The tubular part 38h of the second centering member 38 is longer than the tubular part 41j of the disk contact member 41. The top end of the tubular part 38h is closer to the lower surfaces of the slider 50 and the support member 31 than the top end of the tubular part 41j. Accordingly, as will be described later, when the support member 31 is at the second clamping position and the second centering member 38 is moved to the insertion allowing position, the support member 31 resiliently presses the top end of the tubular part 38h, through the slider 50. In turn, the tapered surface 38a of the second centering member 38 is forcibly inserted into the center hole of the circular substrate 23a of the disk 23.

To play back data from the recording layer of the circular substrate 23a which is currently out of contact with the disk support surface 21c of the turntable 21, the motor 74, as shown in FIG. 8, is further rotated and the moving members 71 and 72 are moved from the middle position in the movement stroke to the final position. The support member 31 is made to further approach the turntable 21. As a result, it is moved from the first clamping position (FIG. 19) to the second clamping position indicated by a solid line in FIG. 20. At this time, the round body 54 is still placed in the concave portion 38i of the second centering member 38. The second centering member 38 is stopped by the disk contact member 41. It is at the insertion prohibiting position where member 38 is prohibited from being inserted into the center hole of the circular substrate 23a. Afterwards, the motor 74 is slightly rotated, to bring the support member 31 to a position indicated by an alternate long and two short dash line shown in FIG. 20, and also shown in FIG. 21. As a result, the slider 50 is pushed down from the first position (FIG. 19) to the second position (FIG. 21). and the concave portion 50c of the slider 50 reaches such a position as to accept the round body 54. At the same time, the slider 50 as pushed down by the support member 31 and the coiled spring 52 which has been compressed due to the downward movement of the slider 50, cooperate to push the top of the tubular part 38h of the second centering member 38. Accordingly, the second centering member 38 is insert into the center hole of the circular substrate 23a. With the wedge action of member 38, the disk 23 is slightly moved in the radial direction.

Figure 20:
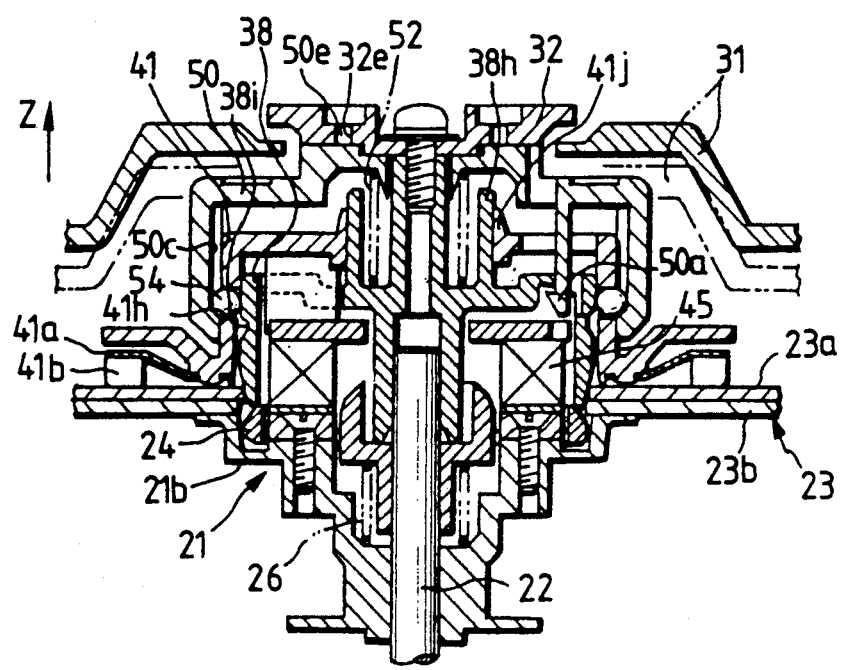
Figure 21:
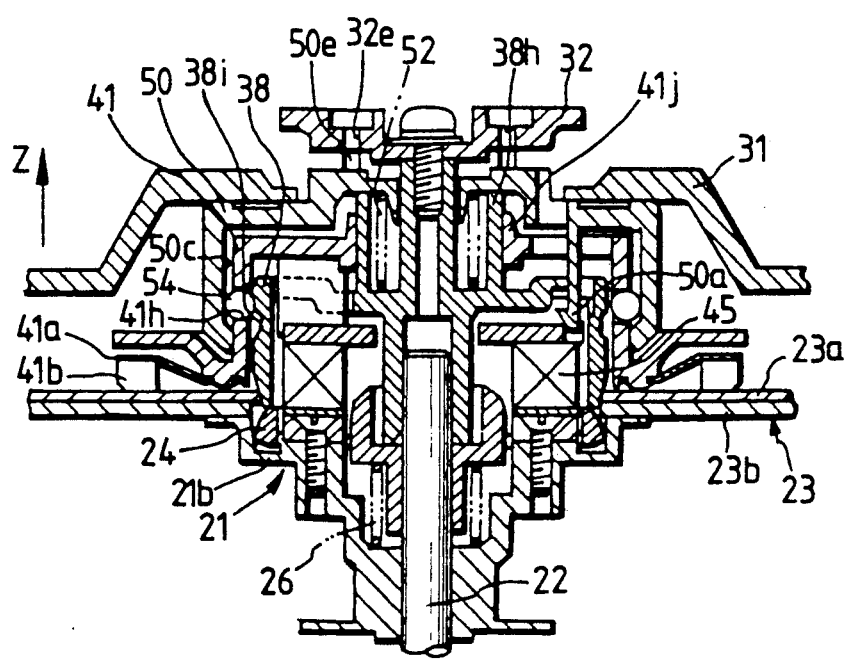

When the circular substrate 23a is centered on the turntable 21, the motor 74 is slightly rotated in the reverse direction, to return the support member 31 to the second position indicated by the solid line in FIG. 20. Under this condition, the support member 31 comes out of contact with the pressure member made up of the rotating member 32 and the disk contact member 41. Then, the slider 50 is caused to return from the position of FIG. 21 to the position of FIG. 20, by the biasing force applied by the coiled spring 52. As seen from FIG. 21, a plurality of projections 50e are formed on the upper surface of the slider 50. The projections 50e are slidably inserted into holes 32e of the rotating member 32, respectively. When the slider 50 moves up and down, the projections 50e are inserted into and pulled out of the holes 32e, respectively. Then, the turntable 21 is reversely rotated, and the pick-up 76 disposed above the disk 23 picks up data from the recording layer on the circular substrate 23a.

Figure 19:
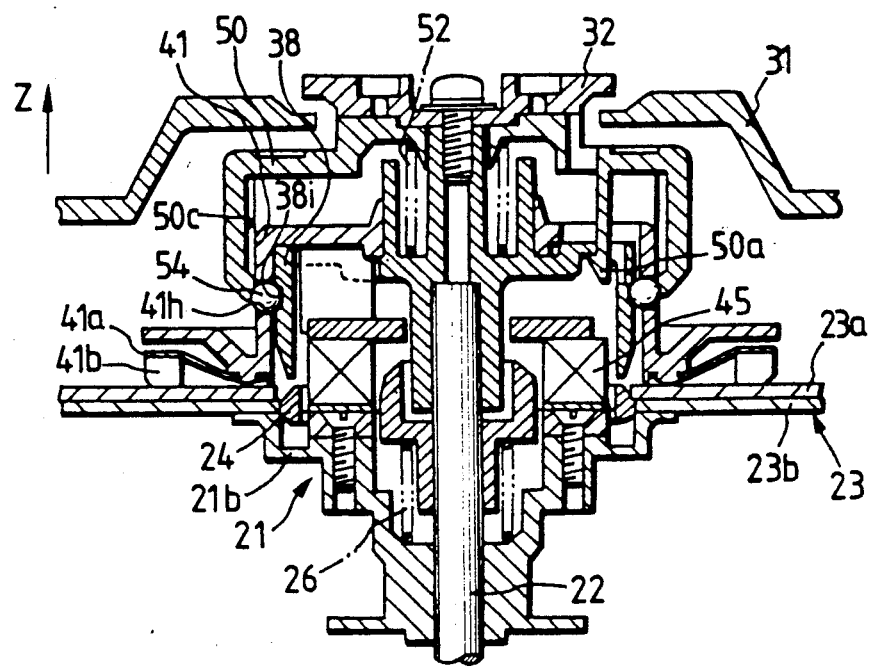
FIGS. 19-21 show sectional views of the disk player of FIG. 17, which are useful in explaining the operation of the clamping mechanism and the disk centering means.

Thereafter, to play back again the data from the recording layer on the substrate 23b, the motor 74 is reversely rotated to lift the support member 31 from the second clamping position indicated by a solid line in FIG. 20 to the first clamping position shown in FIG. 19. With the lifting of the support member 31, the rotating member 32 is pushed up, and in turn the second centering member 38 is lifted out of the center hole of the circular substrate 23a. At the same time, the biasing force by the coiled spring 26 causes the first centering member 24 to move up and above the disk support surface 21c of the turntable 21. As a result, the circular substrate 23b is centered again. With the lifting of the second centering member 38, its concave portion 38i reaches the position receiving the round body 54. Then, the coiled spring 52 lifts the slider 50. The round body 54 departs from the concave portion 50c of the slider 50 and enters the concave portion 38i. Hence, the state of FIG. 19 is set up again. Subsequently, as in the previous case, the turntable 21 is forwardly rotated, and the lower side pick-up 77 picks up data from the recording layer on the circular substrate 23b.

As seen from the foregoing description, when the support member 31 is moved from the first clamping position of FIG. 19 to the second clamping position of FIG. 20 it temporarily engages with the pressure member including the rotating member 32 and the disk contact member 41, through the slider 50. Conversely, also when moved from the second clamping position to the first clamping position, it temporarily engages with the pressure member through the slider 50. As previously noted, when the data is played back from the recording layers on the circular substrates 23a and 23b, which make up the disk 23, the turntable rotating direction for one substrate is reverse to that for the other. When for the disk substrates 23a and 23b, a selection is made between the disk clamping state and the centering state, the support member 31 engages with the pressure member. Under this condition, the rotation or the turntable 21 is braked. Accordingly, the turntable 21 is braked instantly, eliminating the continuous rotating of the turntable due to its inertia. Accordingly, selection can quickly be made between the playback of the substrate 23a data and the playback of the substrate 23b data.

In the above-mentioned embodiments, a pair of optical pick-ups are used which sandwich the disk placed on the turntable. If required, a single optical pick-up may be used. In this case, the pick-up is arranged such that it is movable so as to be able to pick up the data from both sides of the recording layers on the disk.

Also in the above-mentioned embodiments, the support member 31 which supports the clamper, i.e., the pressure member, and positions the pressure member on and removes it from the disk on the turntable, is moved while being kept parallel to the disk carrying surface of the turntable. If required, the support member 31 may be moved in a plane substantially orthogonal to the disk carrying surface of the turntable.

As seen from the foregoing description, in the dual-side use disk player according to the present invention, a pressure applying means for applying a disk pressing force to a pressure member for pressing a disk against a turntable is provided. The pressure member holds a second centering member, which centers on the turntable a circular substrate placed on the non-contact side of the disk (i.e., the side of the disk which is out of contact with the turntable) when the second centering member is inserted into the center hole of the circular substrate. The pressure applying means includes attracting force generating means for attracting the pressure member toward the turntable and position select/hold means is also provided. When a support member for supporting the pressure member is at a non-clamping position farthest from the turntable, the position select/hold means holds the pressure member at a position apart from the disk carrying surface of the turntable. Further, when the support member is at a first clamping position which is a middle position and a second position which is closest to the turntable, the position select/hold means is out of contact with the pressure member. With the movement of the support member between the first clamping position and the second clamping position, the position select/hold means positions the second centering means at an insertion allowing position where the second centering means is allowed to be inserted into the center hole of the circular substrate, and an insertion prohibiting position where the second centering means is prohibited from being inserted thereinto.

The disk pressing forces applied to the disk when the circular substrates constituting the disk are centered, are substantially equal to each other. Accordingly, each substrate is easy to move in the radial direction, thus providing a smooth centering of each substrate.

At the time of the disk clamping the support member is out of contact with the pressure member. The disk being played back is isolated from any external vibrations, thereby ensuring a good musical playback.

Such an arrangement of the disk player according to the present invention succeeds in eliminating use of the expensive bearing between the pressure member and the support member holding it, which is essential to the conventional disk player of this type. This leads to a reduction in the cost to manufacture.

Also, in the disk player according to the present invention, when the support member is at the second position and the second centering member is at the insertion allowing position, the second centering member is closer to the support member than the disk contact member. With this feature, when the support member is moved from the first clamping position to the second clamping position, it is made to nonresiliently engage with the second centering member, causing the second centering member to be inserted into the center hole of the disk circular substrate.

Because of such an arrangement, a relatively small attracting force as generated by the attracting force generating means suffices. Therefore, a small reaction force is applied to the support member when the pressure member is moved out of the range of the attracting force, in order to release the disk from its clamped state. Hence, an excessive force will never be applied to the disk clamping mechanism including the support member, and other mechanisms supporting it. Further, a reaction following the removal of the clamped state is small, eliminating the generation of noise due to a large reaction.

Further, in an arrangement where the second centering member is resiliently moved down by the support member by means of a resilient member such as the coiled spring (52 in the embodiment) rather than the arrangement of the present invention where the second centering member is inserted into the center hole of the circular substrate by making the support member nonresiliently engage with the second centering member, the following drawbacks are encountered. First, in order to center a disk having a large frictional force against the turntable, the resilient member must have a large spring constant in order to overcome the large frictional force. Second, the attracting force generated by the attracting generating means must be large enough to overcome this large spring force to thereby attract the pressure member. In the case where the pressure member is removed from the turntable by pulling the pressure member resisting such a strong attracting force. particularly when a disk is not placed on the turntable and the pressure member is directly placed on the turntable, a large reaction force acts on the respective mechanisms. Accordingly, the reaction force at the time of removing the clamped state is large.

In the disk player according to the present invention, such problems are completely eliminated because of the structural feature as mentioned above.

What is claimed is:

1. A dual-side use disk player of the type in which a data record disk including first and second circular substrates bonded together, each of said first and second circular substrates having a signal recording layer and a center hole, is centered on a turntable and is pressed against said turntable to thereby carry out a playback of data said disk player comprising:

a disk clamping mechanism including a support member movable to and from a disk carrying surface of said turntable within a range of three positions; said three positions being a non-clamping position farthest from said disk carrying surface, a first clamping position which is a middle position, and a second clamping position; said disk clamping mechanism further including positioning means for positioning said support member, a pressure member for pressing a part of said data record disk, which is near the center hole of said data record disk, and pressure applying means for applying a force to said pressure member to press said disk;

disk centering means including a first centering member movable along an axis of said turntable with respect to said disk carrying surface, said first centering member adapted to be inserted into said center hole of said first circular substrate, said disk centering means further including biasing means for biasing said first centering member in a projecting direction, and a second centering member adapted to be inserted into said center hole of said second circular substrate, said second centering member being disposed in said pressure member so as to be movable between an insertion allowing position where said second centering member is allowed to be inserted into said center hole of said second circular substrate, and an insertion prohibiting position where said second centering member is prohibited from being inserted into said center hole of said second circular substrate, whereby with the movement of said support member to said second clamping position, said second centering member is moved near said disk carrying surface and inserted into said center hole of said second circular substrate, and said first centering member is moved below said disk carrying surface; and wherein said pressure applying means includes an attracting force generating means for attracting said pressure member toward said turntable; and further wherein said support member includes position select/hold means, whereby when said support member is at said non-clamping position, said position select/hold means is out of contact with said pressure member, and with the movement of said support member between said first clamping position and said second clamping position, said position select/hold means positions said second centering member at said insertion allowing position, and also at said insertion prohibiting position.

2. The dual-side use disk player according to claim 1, in which said support member engages with said pressure member when said support member is moved from said first clamping position to said second clamping position and vice versa.

3. The dual-side use disk player according to claim 1 or 2, in which said attracting force generating means is provided in either of said turntable and said pressure member, and includes a magnet and a magnetic member.

4. The dual-side use disk player according to claim 1, further comprising a resilient member for pressing said data record disk at a free end thereof, said resilient member being mounted to said pressure member in a cantilever fashion.

5. A dual-side use disk player of the type in which a data record disk including first and second circular substrates bonded together, each of said first and second circular substrates having a signal recording layer and a center hole, is centered on a turntable and is pressed against said turntable to thereby carry out a playback of data, said disk player comprising:

a disk clamping mechanism including a support member movable to and from a disk carrying surface of said turntable within a range of three positions; said three positions being a non-clamping position farthest from said disk carrying surface, a first clamping position which is a middle position, and a second clamping position, said disk clamping mechanism further including positioning means for positioning said support member, a pressure member having a disk contact member for coming in contact with and pressing a part of said data record disk which is near the center hole of said data record disk, and pressure applying means for applying a force to said pressure member to press said disk;

disk centering means including a first centering member movable along an axis of said turntable with respect to said disk carrying surface said first centering member adapted to be inserted into said center hole of said first circular substrate, said disk centering means further including biasing means for biasing said first centering member in a projecting direction, and a second centering member adapted to be inserted into said center hole of said second circular substrate, said second centering member being disposed in said pressure member so as to be movable between an insertion allowing position where said second centering member is allowed to be inserted into said center hole of said second circular member, and an insertion prohibiting position where said second centering member is prohibited from being inserted into said center hole of said second circular substrate, whereby with the movement of said support member to said second clamping position, said second centering member is moved near said disk carrying surface and inserted into said center hole of said second circular substrate, and said first centering member is moved below said disk carrying surface; and wherein said pressure applying means includes an attracting force generating means for attracting said pressure member toward said turntable; and further wherein said support member includes position select/hold means, whereby when said support member is at said non-clamping position, said position select/hold means is out of contact with said pressure member, so that with the movement of said support member between said first clamping position and said second clamping position, said position select/hold means positions said second centering member at said insertion allowing position, and also at said insertion prohibiting position, and when said support member is at said second clamping position and said second centering member is at said insertion allowing position, said second centering member is closer to said support member than said disk contact member.

6. The dual-side use disk player according to claim 5, in which said support member engages with said pressure member when said support member is moved from said first clamping position to said second clamping position and vice versa.

7. The dual-side use disk player according to claim 5 or 6, in which said attracting force generating means is provided in either of said turntable and said pressure member, and includes a magnet and a magnetic member.

8. The dual-side use disk player according to claim 5, further comprising a resilient member for pressing said data record disk at a free end thereof, said resilient member being mounted to said pressure member in a cantilever fashion.

* * * * *